(12) United States Patent
Swoboda et al.

(10) Patent No.: US 7,225,365 B2
(45) Date of Patent: May 29, 2007

(54) APPARATUS AND METHOD FOR IDENTIFICATION OF A NEW SECONDARY CODE START POINT FOLLOWING A RETURN FROM A SECONDARY CODE EXECUTION

(75) Inventors: Gary L. Swoboda, Sugar Land, TX (US); Bryan Thome, Missouri City, TX (US); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 501 days.

(21) Appl. No.: 10/729,326

(22) Filed: Dec. 5, 2003

(65) Prior Publication Data
US 2004/0133824 A1    Jul. 8, 2004

Related U.S. Application Data

(60) Provisional application No. 60/434,172, filed on Dec. 17, 2002.

(51) Int. Cl.
*G06F 11/00* (2006.01)
(52) U.S. Cl. .......................... 714/45; 714/30; 712/227; 717/128

(58) Field of Classification Search .................. None
See application file for complete search history.

(56) References Cited

U.S. PATENT DOCUMENTS

| | | | |
|---|---|---|---|
| 5,802,272 A * | 9/1998 | Sites et al. ..................... 714/45 |
| 6,493,837 B1 * | 12/2002 | Pang et al. ..................... 714/45 |
| 6,530,076 B1 * | 3/2003 | Ryan et al. ................. 717/128 |
| 2004/0064685 A1 * | 4/2004 | Nguyen et al. ............. 712/227 |
| 2004/0133824 A1 * | 7/2004 | Swoboda et al. ............. 714/39 |

\* cited by examiner

*Primary Examiner*—Yolanda L Wilson
(74) *Attorney, Agent, or Firm*—William W. Holloway; W. James Brady; Frederick J. Telecky, Jr.

(57) ABSTRACT

When a NEW SECONDARY CODE EXECUTION START POINT signal is generated in a target processor during a test procedure after the return from an interrupt service routine (i.e., an original secondary code sequence), a sync marker is generated in a program counter trace stream. The sync marker includes a plurality of packets, the packets identifying that the sync marker is has been generated as a result of the NEW SECONDARY CODE EXECUTION START POINT signal. The new secondary program code start point sync marker identifies the absolute program counter address at the time of the generation of the NEW SECONDARY CODE EXECUTION START POINT signal and relates the NEW SECONDARY CODE EXECUTION START POINT signal sync marker to a timing trace stream.

11 Claims, 7 Drawing Sheets

```
SYNC POINT TYPE
TYPE FAMILY
BRANCH INDEX
SYNC POINT ID
TIMING INDEX
TYPE DATA
ABSOLUTE PC ADDRESS
PC OFFSET COUNTER ADDRESS
```

APPARATUS AND METHOD FOR IDENTIFICATION OF A NEW SECONDARY CODE START POINT FOLLOWING A RETURN FROM A SECONDARY CODE EXECUTION

This application claims priority under 35 USC §119(e)(1) of Provisional Application No. 60/434,172 (TI-34668P) filed Dec. 17, 2002.

RELATED APPLICATIONS

U.S. patent application Ser. No. 10/728,627, entitled APPARATUS AND METHOD FOR SYNCHRONIZATION OF TRACE STREAMS FROM MULTIPLE PROCESSING UNITS, invented by Gary L. Swoboda, filed on even date herewith, and assigned to the assignee of the present application; U.S. patent application Ser. No. 10/729,212, entitled APPARATUS AND METHOD FOR SEPARATING DETECTION AND ASSERTION OF A TRIGGER EVENT, invented by Gary L. Swoboda, filed on even date herewith, and assigned to the assignee of the present application; U.S. patent application Ser. No. 10/729,239, entitled APPARATUS AND METHOD FOR STATE SELECTABLE TRACE STREAM GENERATION, invented by Gary L. Swoboda, filed on even date herewith, and assigned to the assignee of the present application; U.S. patent application Ser. No. 10/729,650, entitled APPARATUS AND METHOD FOR SELECTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,591, entitled APPARATUS AND METHOD FOR REPORTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,407, entitled APPARATUS AND METHOD FOR A FLUSH PROCEDURE IN AN INTERRUPTED TRACE STREAM, invented by Gary L. Swoboda, filed on even date herewith, and assigned to the assignee of the present application; U.S. patent application Ser. No. 10/729,564, entitled APPARATUS AND METHOD FOR CAPTURING AN EVENT OR COMBINATION OF EVENTS RESULTING IN A TRIGGER SIGNAL IN A TARGET PROCESSOR, invented by Gary L. Swoboda, filed on even date herewith, and assigned to the assignee of the present application; U.S. patent application Ser. No. 10/729,400, entitled APPARATUS AND METHOD FOR CAPTURING THE PROGRAM COUNTER ADDRESS ASSOCIATED WITH A TRIGGER SIGNAL IN A TARGET PROCESSOR, invented by Gary L. Swoboda, filed on even date herewith, and assigned to the assignee of the present application; U.S. patent application Ser. No. 10/729,592, entitled APPARATUS AND METHOD DETECTING ADDRESS CHARACTERISTICS FOR USE WITH A TRIGGER GENERATION UNIT IN A TARGET PROCESSOR, invented by Gary L. Swoboda and Jason L. Peck, filed on even date herewith, and assigned to the assignee of the present application U.S. patent application Ser. No. 10/729,639, entitled APPARATUS AND METHOD FOR TRACE STREAM IDENTIFICATION OF A PROCESSOR RESET, invented by Gary L. Swoboda and Bryan Thome, filed on even date herewith, and assigned to the assignee of the present application; U.S. patent application Ser. No. 10/729,327, entitled APPARATUS AND METHOD FOR TRACE STREAM IDENTIFICATION OF A PIPELINE FLATTENER PRIMARY CODE FLUSH FOLLOWING INITIATION OF AN INTERRUPT SERVICE ROUTINE; invented by Gary L. Swoboda and Bryan Thome, filed on even date herewith, and assigned to the assignee of the present application; U.S. patent application Ser. No. 10/729,647, entitled APPARATUS AND METHOD FOR TRACE STREAM IDENTIFICATION OF A PIPELINE FLATTENER SECONDARY CODE FLUSH FOLLOWING A RETURN TO PRIMARY CODE EXECUTION, invented by Gary L. Swoboda and Bryan Thome, filed on even date herewith, and assigned to the assignee of the present application; U.S. patent application Ser. No. 10/729,401, entitled APPARATUS AND METHOD IDENTIFICATION OF A PRIMARY CODE START SYNC POINT FOLLOWING A RETURN TO PRIMARY CODE EXECUTION, invented by Gary L. Swoboda, filed on even date herewith, and assigned to the assignee of the present application; U.S. patent application Ser. No. 10/729,190, entitled APPARATUS AND METHOD FOR TRACE STREAM IDENTIFICATION OF A PAUSE POINT IN A CODE EXECUTION SEQUENCE, invented by Gary L. Swoboda, filed on even date herewith, and assigned to the assignee of the present application; U.S. patent application Ser. No. 10/729,196, entitled APPARATUS AND METHOD FOR COMPRESSION OF A TIMING TRACE STREAM, invented by Gary L. Swoboda and Bryan Thome, filed on even date herewith, and assigned to the assignee of the present application; U.S. patent application Ser. No. 10/729,272, entitled APPARATUS AND METHOD FOR TRACE STREAM IDENTIFICATION OF MULTIPLE TARGET PROCESSOR EVENTS, invented by Gary L. Swoboda and Bryan Thome, filed on even date herewith, and assigned to the assignee of the present application; and U.S. patent application Ser. No. 10/729,191, entitled APPARATUS AND METHOD FOR OP CODE EXTENSION IN PACKET GROUPS TRANSMITTED IN TRACE STREAMS, invented by Gary L. Swoboda and Bryan Thome, filed on even date herewith, and assigned to the assignee of the present application are related applications.

BACKGROUND OF THE INVENTION

1. Field of the Invention

This invention relates generally to the testing of digital signal processing units and, more particularly, to the signals that are transmitted from a target processor to a host processing to permit analysis of the target processor operation. Certain events in the target processor must be communicated to the host processing unit along with contextual information. In this manner, the test and debug data can be analyzed and problems in the operation of the target processor identified.

2. Description of Related Art

Figure 1A:
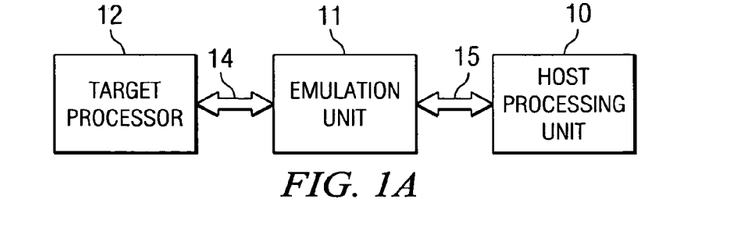

As microprocessors and digital signal processors have become increasingly complex, advanced techniques have been developed to test these devices. Dedicated apparatus is available to implement the advanced techniques. Referring to FIG. 1A, a general configuration for the test and debug of a target processor 12 is shown. The test and debug procedures operate under control of a host processing unit 10. The host processing unit 10 applies control signals to the emulation unit 11 and receives (test) data signals from the emulation unit 11 by cable connector 14. The emulation unit 11 applies control signals to and receives (test) signals from the target processing unit 12 by connector cable 15. The emulation unit 11 can be thought of as an interface unit between the host processing unit 10 and the target processor 12. The emulation unit 11 processes the control signals from the host processor unit 10 and applies these signals to the target processor 12 in such a manner that the target processor will respond with the appropriate test signals. The test signals from the target processor 12 can be a variety types. Two of the most popular test signal types are the JTAG (Joint Test Action Group) signals and trace signals. The JTAG protocol provides a standardized test procedure in wide use in which the status of selected components is determined in response to control signals from the host processing unit. Trace signals are signals from a multiplicity of selected locations in the target processor 12 during defined period of operation. While the width of the bus 15 interfacing to the host processing unit 10 generally has a standardized dimension, the bus between the emulation unit 11 and the target processor 12 can be increased to accommodate an increasing amount of data needed to verify the operation of the target processing unit 12. Part of the interface function between the host processing unit 10 and the target processor 12 is to store the test signals until the signals can be transmitted to the host processing unit 10.

Figure 1B:
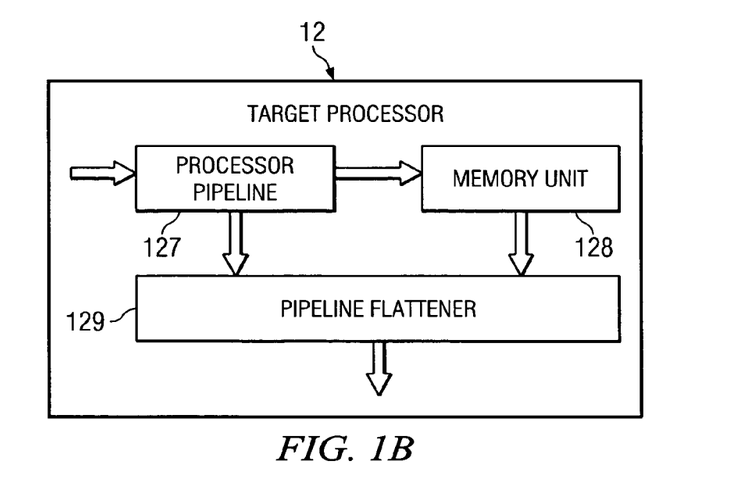
FIG. 1B is a block diagram illustrating the components of the target processor relevant to the present invention.

In testing the target processors, certain events must be identified by the host processing unit. To understand the origin of the program flush sync point, portions of the target processor must be considered in more detail. Referring to FIG. 1B, the target processor pipeline 127 executes program instructions. After the instruction has been processed by the processor pipeline 127, an access of the memory unit 128 results in a delay. To accommodate this delay, the instruction, is placed in a pipeline flattener 129. The pipeline flattener 129 is similar to a first in-first out storage unit. However, the instruction remains in the pipeline flattener 129 until the results of the memory unit access are stored in the location along with the instruction. When the pipeline flattener 129 becomes full, a new instruction results in the transfer from the pipeline flattener 129 to the appropriate location in the target processor.

Figure 1C:
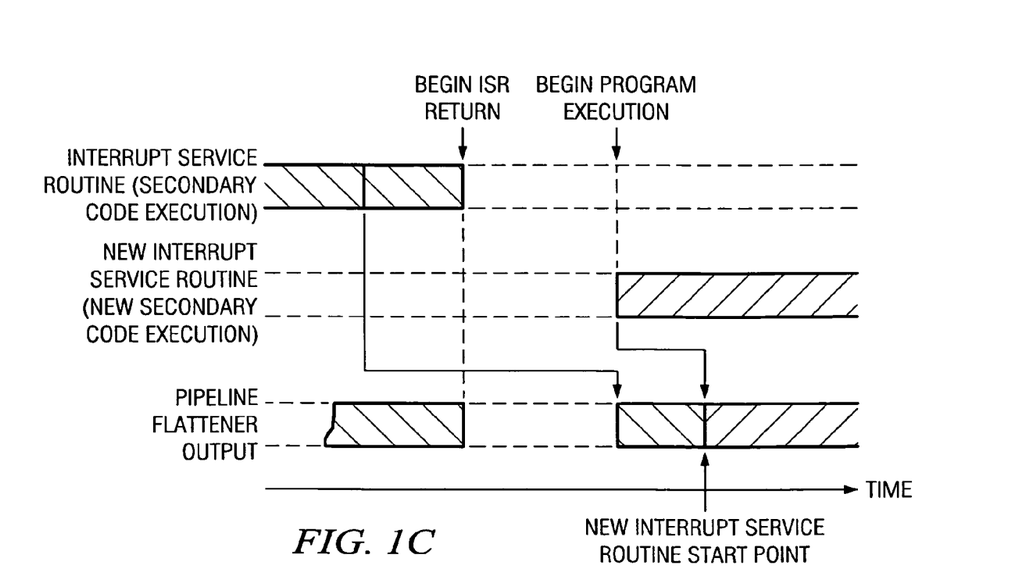
FIG. 1C illustrates the operation of the components of FIG. 1B.

Referring to FIG. 1C, the secondary (interrupt service routine) code execution has been halted or completed (upper graph) and a new secondary (interrupt service routine) code begins execution (middle graph). The lower graph illustrates that the results of the original secondary code execution are being withdrawn from the pipeline flattener. At the breakpoint in the original secondary code execution, both the unprotected processor pipeline and the pipeline flattener halt operation. Although instructions are no longer being transferred to or from the pipeline flattener, the results of the memory accesses are still being added to the instruction locations in the pipeline flattener. After some period of time, the new secondary code execution begins. As a result of the original secondary code execution and the pipeline flattener latency, the pipeline flattener transfers instructions still stored in the pipeline flattener remaining from the original secondary code execution before transferring the results of the new secondary code execution. After the instructions remaining in the pipeline flattener from the original secondary code execution have been removed, the instructions for the new secondary code routine are transmitted from the pipeline flattener as a result of the secondary code execution. It is important to communicate to the host processing unit where the execution of the new secondary code execution begins, i.e., the instructions from the new secondary code execution exit from the pipeline flattener.

A need has been felt for apparatus and an associated method having the feature that a point at which the new secondary code execution begins is identified in a target processor and that the new secondary code execution start point is communicated to the host processing unit. It is another feature of the apparatus and associated method to transfer information concerning the start of a new secondary code execution to the host processing unit using the trace streams. It is a still further feature of the apparatus and associated method to communicate to the host processing unit when the new secondary code execution is begun relative to the target processor activity.

SUMMARY OF THE INVENTION

The aforementioned and other features are accomplished, according to the present invention, by providing the target processor with at least two trace streams. One of the trace streams is a timing trace stream. The second trace stream is the program counter trace stream. When a beginning of a new secondary code execution following execution of an original secondary code execution is identified, a new secondary code start point sync marker is generated in the program counter trace stream. This new secondary code start point sync marker includes a signal group identifying the event as a new secondary code execution start point, a signal group relating the new secondary program code execution to the timing trace stream, and a signal group identifying the point in the program execution where the new secondary code execution start point is identified. The point in the program execution where the new secondary code execution start point is identified is determined by indicia in each location in the pipeline flattener. The indicia indicate when the instructions identifying a particular program exits the pipeline flattener. The time of the occurrence of the new secondary code execution start point is determined by trace synchronization markers and by a position of a clock cycle in a timing packet.

Other features and advantages of present invention will be more clearly understood upon reading of the following description and the accompanying drawings and the claims.

BRIEF DESCRIPTION OF THE DRAWINGS

FIG. 1A is a general block diagram of a system configuration for test and debug of a target processor, while

FIG. 4A illustrates format by which the timing packets are assembled according to the present invention, while FIG. 4B illustrates the inclusion in the timing trace stream of a periodic sync signal according to the present in.

FIG. 6A illustrates the sync markers in the program counter trace stream when a periodic sync point ID is generated, while

DESCRIPTION OF THE PREFERRED EMBODIMENT

1. Detailed Description of the Figures

FIG. 1A, FIG. 1B, and FIG. 1C have been described with respect to the related art.

Figure 2:
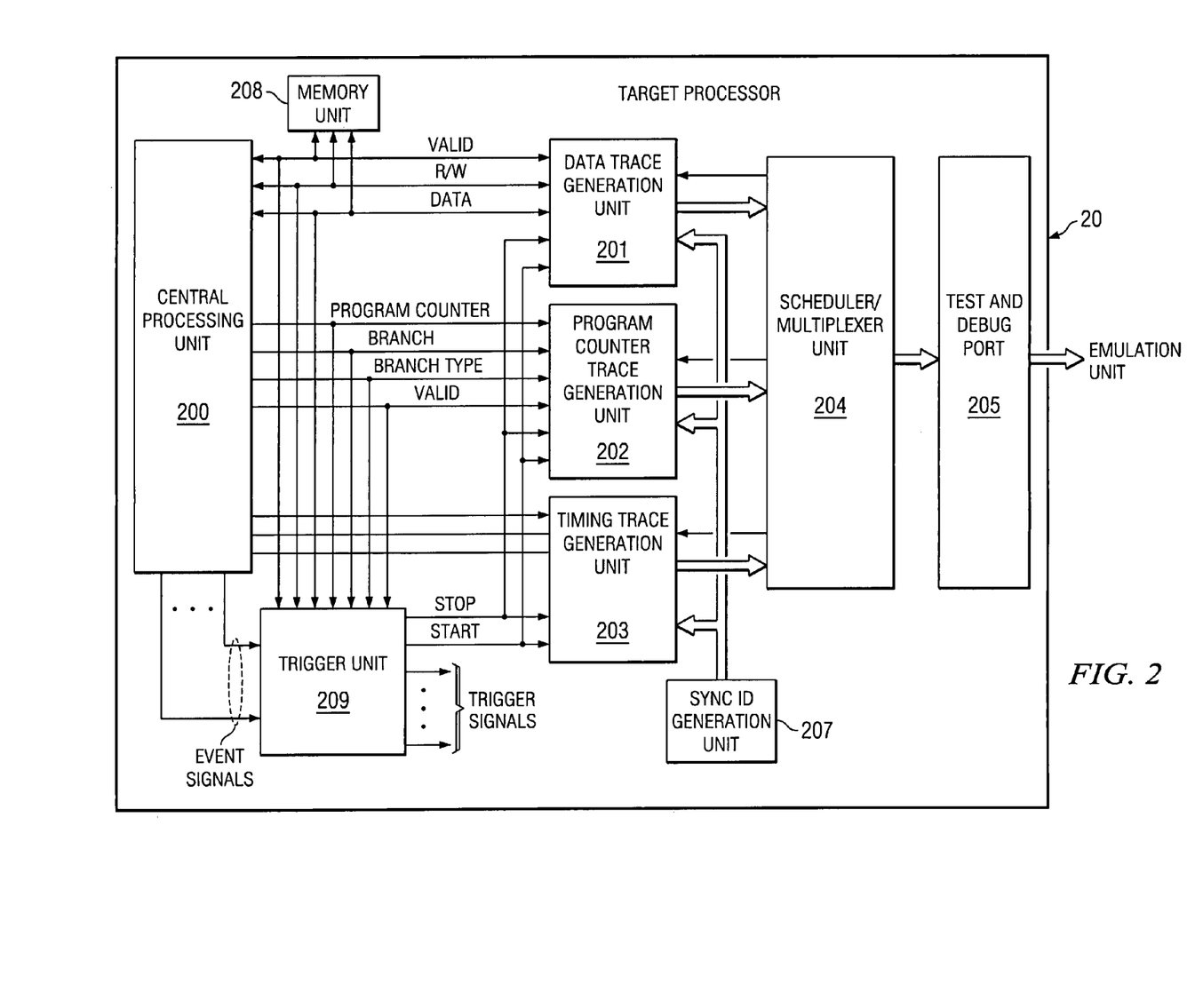
FIG. 2 is a block diagram of selected components in the target processor used the testing of the central processing unit of the target processor according to the present invention.

Referring to FIG. 2, a block diagram of selected components of a target processor 20, according to the present invention, is shown. The target processor includes at least one central processing unit 200 and a memory unit 208. The central processing unit 200 and the memory unit 208 are the components being tested. The trace system for testing the central processing unit 200 and the memory unit 202 includes three packet generating units, a data packet generation unit 201, a program counter packet generation unit 202 and a timing packet generation unit 203. The data packet generation unit 201 receives VALID signals, READ/WRITE signals and DATA signals from the central processing unit 200. After placing the signals in packets, the packets are applied to the scheduler/multiplexer unit 204 and forwarded to the test and debug port 205 for transfer to the emulation unit 11. The program counter packet generation unit 202 receives PROGRAM COUNTER signals, VALID signals, BRANCH signals, and BRANCH TYPE signals from the central processing unit 200 and, after forming these signal into packets, applies the resulting program counter packets to the scheduler/multiplexer 204 for transfer to the test and debug port 205. The timing packet generation unit 203 receives ADVANCE signals, VALID signals and CLOCK signals from the central processing unit 200 and, after forming these signal into packets, applies the resulting packets to the scheduler/multiplexer unit 204 and the scheduler/multiplexer 204 applies the packets to the test and debug port 205. Trigger unit 209 receives EVENT signals from the central processing unit 200 and signals that are applied to the data trace generation unit 201, the program counter trace generation unit 202, and the timing trace generation unit 203. The trigger unit 209 applies TRIGGER and CONTROL signals to the central processing unit 200 and applies CONTROL (i.e., STOP and START) signals to the data trace generation unit 201, the program counter generation unit 202, and the timing trace generation unit 203. The sync ID generation unit 207 applies signals to the data trace generation unit 201, the program counter trace generation unit 202 and the timing trace generation unit 203. While the test and debug apparatus components are shown as being separate from the central processing unit 201, it will be clear that an implementation these components can be integrated with the components of the central processing unit 201.

Figure 3:
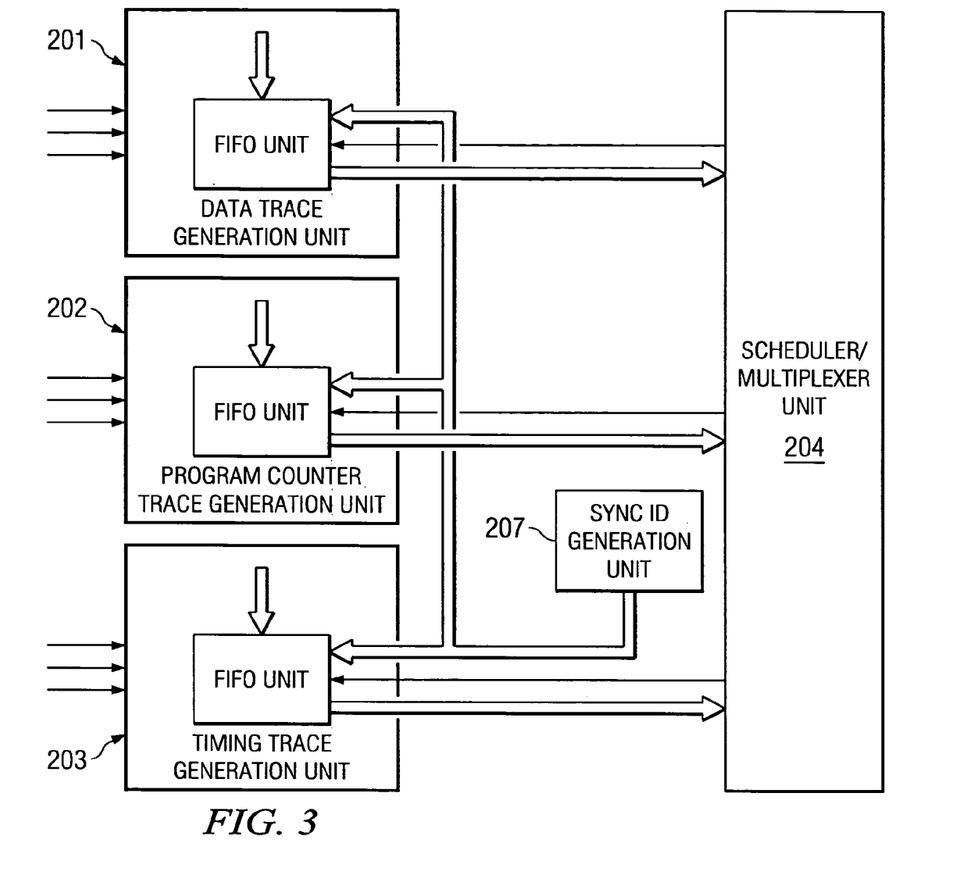
FIG. 3 is a block diagram of selected components of the illustrating the relationship between the components transmitting trace streams in the target processor.

Referring to FIG. 3, the relationship between selected components in the target processor 20 is illustrated. The data trace generation unit 201 includes a packet assembly unit 2011 and a FIFO (first in/first out) storage unit 2012, the program counter trace generation unit 202 includes a packet assembly unit 2021 and a FIFO storage unit 2022, and the timing trace generation unit 203 includes a packet generation unit 2031 and a FIFO storage unit 2032. As the signals are applied to the packet generators 201, 202, and 203, the signals are assembled into packets of information. The packets in the preferred embodiment are 10 bits in width. Packets are assembled in the packet assembly units in response to input signals and transferred to the associated FIFO unit. The scheduler/multiplexer 204 generates a signal to a selected trace generation unit and the contents of the associated FIFO storage unit are transferred to the scheduler/multiplexer 204 for transfer to the emulation unit. Also illustrated in FIG. 3 is the sync ID generation unit 207. The sync ID generation unit 207 applies an SYNC ID signal to the packet assembly unit of each trace generation unit. The periodic signal, a counter signal in the preferred embodiment, is included in a current packet and transferred to the associated FIFO unit. The packet resulting from the SYNC ID signal in each trace is transferred to the emulation unit and then to the host processing unit. In the host processing unit, the same count in each trace stream indicates that the point at which the trace streams are synchronized. In addition, the packet assembly unit 2031 of the timing trace generation unit 203 applies and INDEX signal to the packet assembly unit 2021 of the program counter trace generation unit 202. The function of the INDEX signal will be described below.

Figure 4A:
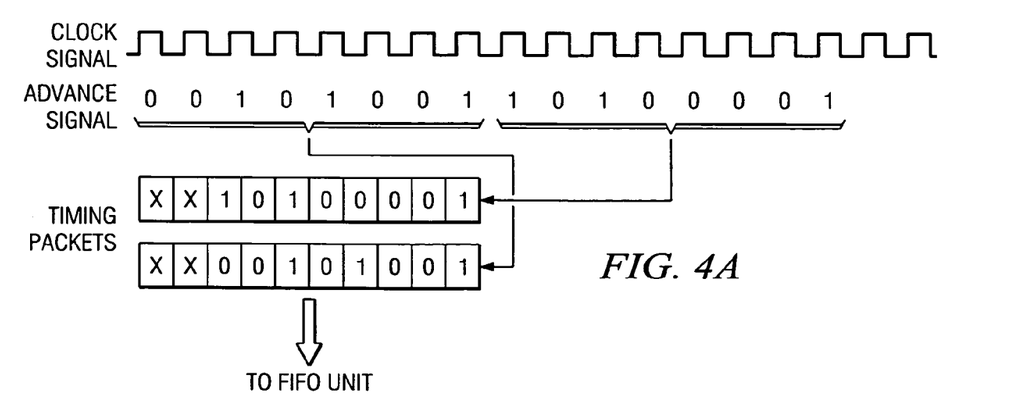

Referring to FIG. 4A, the assembly of timing packets is illustrated. The signals applied to the timing trace generation unit 203 are the CLOCK signals and the ADVANCE signals. The CLOCK signals are system clock signals to which the operation of the central processing unit 200 is synchronized. The ADVANCE signals indicate an activity such as a pipeline advance or program counter advance (( )) or a pipeline non-advance or program counter non-advance (1). An ADVANCE or NON-ADVANCE signal occurs each clock cycle. The timing packet is assembled so that the logic signal indicating ADVANCE or NON-ADVANCE is transmitted at the position of the concurrent CLOCK signal. These combined CLOCK/ADVANCE signals are divided into groups of 8 signals, assembled with two control bits in the packet assembly unit 2031, and transferred to the FIFO storage unit 2032.

Figure 4B:
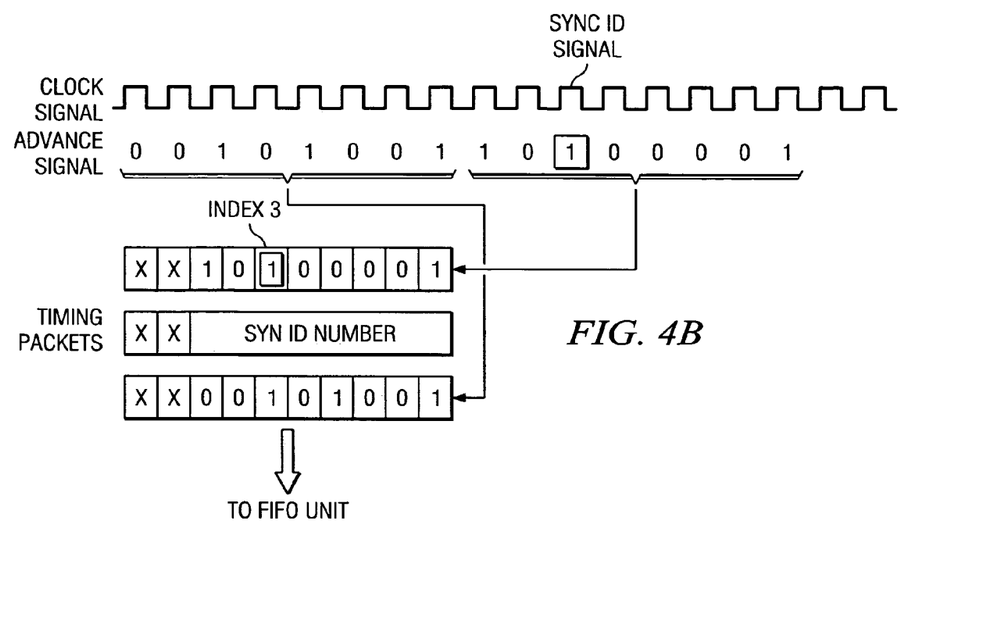

Referring to FIG. 4B, the trace stream generated by the timing trace generation unit 203 is illustrated. The first (in time) trace packet is generated as before. During the assembly of the second trace packet, a SYNC ID signal is generated during the third clock cycle. In response, the timing packet assembly unit 2031 assembles a packet in response to the SYNC ID signal that includes the sync ID number. The next timing packet is only partially assembled at the time of the SYNC ID signal. In fact, the SYNC ID signal occurs during the third clock cycle of the formation of this timing packet. The timing packet assembly unit 2031 generates a TIMING INDEX 3 signal (for the third packet clock cycle at which the SYNC ID signal occurs) and transmits this TIMING INDEX 3 signal to the program counter packet assembly unit 2031.

Figure 5:
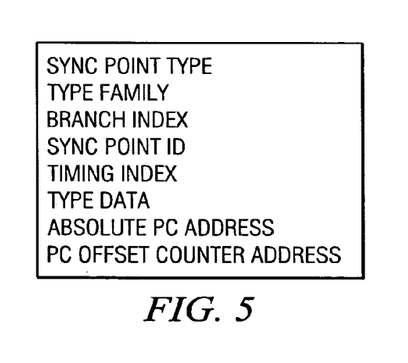
FIG. 5 illustrates the parameters for sync markers in the program counter stream packets according to the present invention.

Referring to FIG. 5, the parameters of a sync marker in the program counter trace stream, according to the present invention is shown. The program counter stream sync markers each have a plurality of packets associated therewith. The packets of each sync marker can transmit a plurality of parameters. A SYNC POINT TYPE parameter defines the event described by the contents of the accompanying packets. A program counter TYPE FAMILY parameter provides a context for the SYNC POINT TYPE parameter and is described by the first two most significant bits of a second header packet. A BRANCH INDEX parameter in all but the final SYNC POINT points to a bit within the next relative branch packet following the SYNC POINT. When the program counter trace stream is disabled, this index points a bit in the previous relative branch packet when the BRANCH INDEX parameter is not a logic "0". In this situation, the branch register will not be complete and will be considered as flushed. When the BRANCH INDEX is a logic "0", this value point to the least significant value of branch register and is the oldest branch in the packet. A SYNC ID parameter matches the SYNC POINT with the corresponding TIMING and/or DATA SYNC POINT which are tagged with the same SYNC ID parameter. A TIMING INDEX parameter is applied relative to a corresponding TIMING SYNC POINT. For all but LAST POINT SYNC events, the first timing packet after the TIMING PACKET contains timing bits during which the SYNC POINT occurred. When the timing stream is disabled, the TIMING INDEX points to a bit in the timing packet just previous to the TIMING SYNC POINT packet when the TIMING INDEX value is nor zero. In this situation, the timing packet is considered as flushed. A TYPE DATA parameter is defined by each SYNC TYPE. An ABSOLUTE PC VALUE is the program counter address at which the program counter trace stream and the timing information are aligned. An OFFSET COUNT parameter is the program counter offset counter at which the program counter and the timing information are aligned.

Figure 6A:
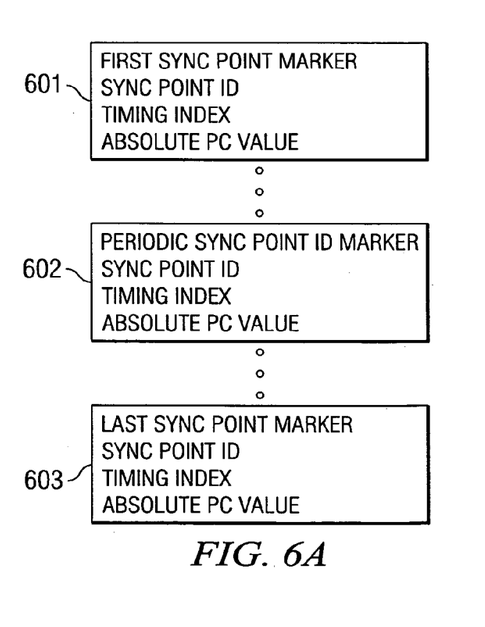

Referring to FIG. 6A, a program counter trace stream for a hypothetical program execution is illustrated. In this program example, the execution proceeds without interruption from external events. The program counter trace stream will consist of a first sync point marker 601, a plurality of periodic sync point ID markers 602, and last sync point marker 603 designating the end of the test procedure. The principal parameters of each of the packets are a sync point type, a sync point ID, a timing index, and an absolute PC value. The first and last sync points identify the beginning and the end of the trace stream. The sync ID parameter is the value from the value from the most recent sync point ID generator unit. In the preferred embodiment, this value in a 3-bit logic sequence. The timing index identifies the status of the clock signals in a packet, i.e., the position in the 8 position timing packet when the event producing the sync signal occurs. And the absolute address of the program counter at the time that the event causing the sync packet is provided. Based on this information, the events in the target processor can be reconstructed by the host processor.

Figures 6B, 7, 8C:
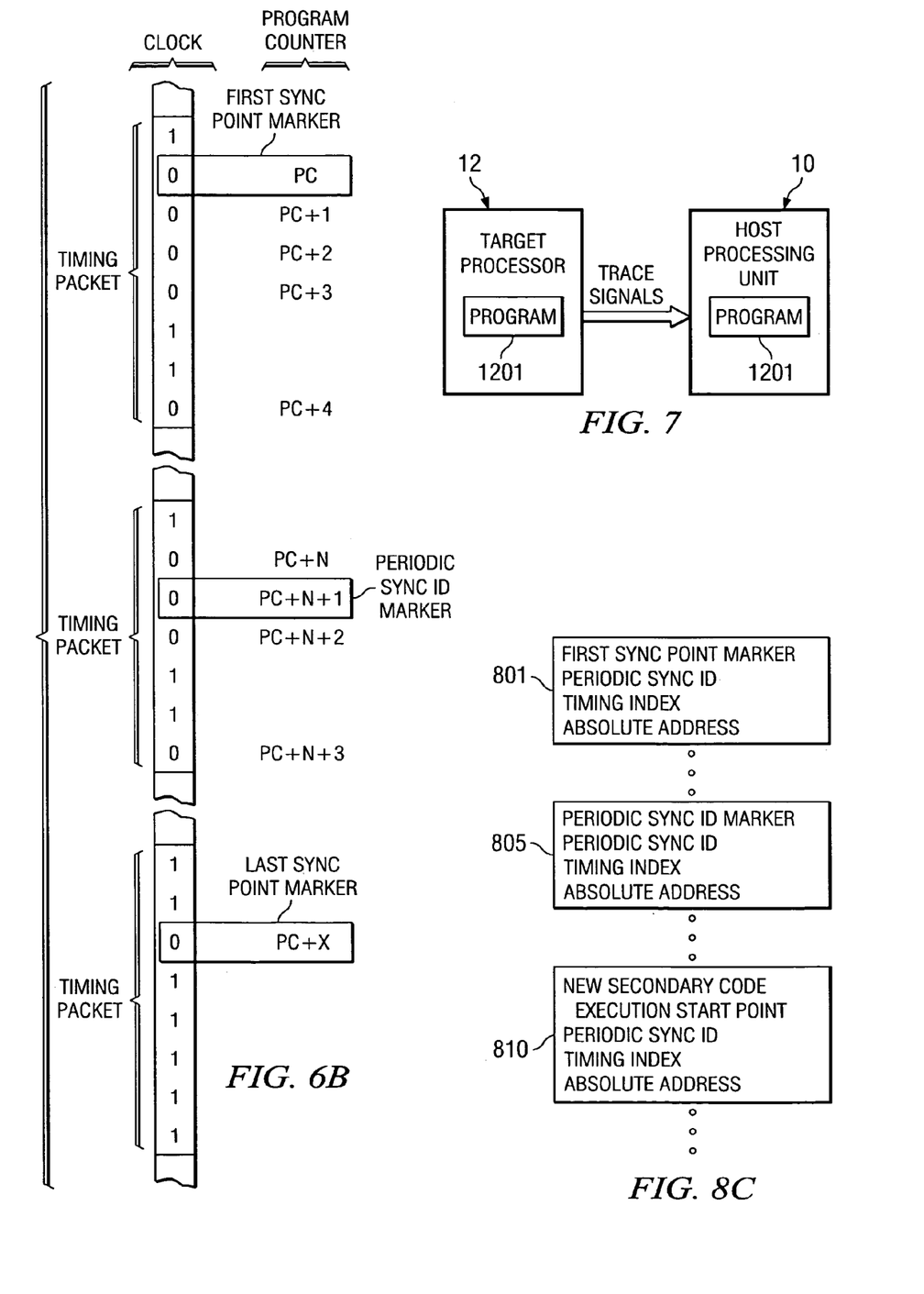
FIG. 6B illustrates the reconstruction of the target processor operation from the trace streams according to the present invention.
FIG. 7 is a block diagram illustrating the apparatus used in reconstructing the processor operation from the trace streams according to the present invention.
FIG. 8C illustrates the reconstruction of the processor operation from the trace streams according to the present invention.

Referring to FIG. 6B, the reconstruction of the program execution from the timing and program counter trace streams is illustrated. The timing trace stream consists of packets of 8 logic "0"s and logic "1"s. The logic "0"s indicate that either the program counter or the pipeline is advanced, while the logic "1"s indicate the either the program counter or the pipeline is stalled during that clock cycle. Because each program counter trace packet has an absolute address parameter, a sync ID, and the timing index in addition to the packet identifying parameter, the program counter addresses can be identified with a particular clock cycle. Similarly, the periodic sync points can be specifically identified with a clock cycle in the timing trace stream. In this illustration, the timing trace stream and the sync ID generating unit are in operation when the program counter trace stream is initiated. The periodic sync point is illustrative of the plurality of periodic sync points that would typically be available between the first and the last trace point, the periodic sync points permitting the synchronization of the three trace streams for a processing unit.

Referring to FIG. 7, the general technique for reconstruction of the trace streams is illustrated. The trace streams originate in the target processor 12 as the target processor 12 is executing a program 1201. The trace signals are applied to the host processing unit 10. The host processing unit 10 also includes the same program 1201. Therefore, in the illustrative example of FIG. 6 wherein the program execution proceeds without interruptions or changes, only the first and the final absolute addresses of the program counter are needed. Using the advance/non-advance signals of the timing trace stream, the host processing unit can reconstruct the program as a function of clock cycle. Therefore, without the sync ID packets, only the first and last sync markers are needed for the trace stream. This technique results in reduced information transfer. FIG. 6 includes the presence of periodic sync ID cycles, of which only one is shown. The periodic sync ID packets are important for synchronizing the plurality of trace streams, for selection of a particular portion of the program to analyze, and for restarting a program execution analysis for a situation wherein at least a portion of the data in the trace data stream is lost. The host processor can discard the (incomplete) trace data information between two sync ID packets and proceed with the analysis of the program outside of the sync timing packets defining the lost data.

Figure 8A:
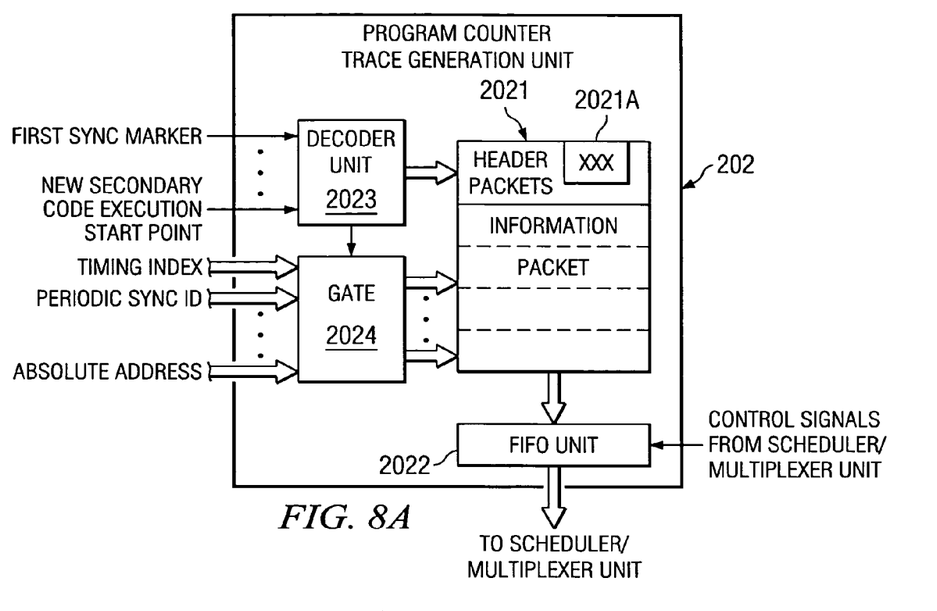
FIG. 8A is block diagram of the program counter sync marker generation unit.

Referring to FIG. 8A, the major components of the program counter packet generation unit 202 is shown. The program counter packet generation unit 202 includes a decoder unit 2023, storage unit 2021, a FIFO unit 2022, and a gate unit 2024. PERIODIC SYNC ID signals, TIMING INDEX signals, and ABSOLUTE ADDRESS signals are applied to gate unit 2024. When the PERIODIC SYNC ID signals are incremented, the decoder unit 2023, in response to the PERIODIC SYN ID signal, stores a periodic sync ID header signal group in a predetermined location 2021A of the header portion of the storage unit 2021. The PERIODIC SYNC signal causes the gate 2024 to transmit the PERIODIC SYNC ID signals, the TIMING INDEX signals and the ABSOLUTE ADDRESS signals. These transmitted signals are stored in the storage unit 2021 in information packet locations assigned to these parameters. When all of the portions of the periodic sync marker have been assembled in the storage unit 2021, then the component packets of the periodic sync marker are transferred to the FIFO unit 2022 for eventual transmission to the scheduler/multiplexer unit. Similarly, when a NEW SECONDARY CODE EXECUTION START POINT signal is generated and applied to the decoder unit 2023, the new secondary code execution start point header-identifying signal group is stored in position 2021A in the header portion of the storage unit 2021. The NEW SECONDARY CODE EXECUTION START POINT signal applied to decoder unit 2023 results in a control signal being applied to the gate 2024. As a result of the control signal, the SYNC ID signals, the TIMING INDEX signals, and the ABSOLUTE ADDRESS signals are stored in the appropriate locations in storage unit 2021. When the new secondary code execution start point signal sync marker has been assembled, i.e., in packets, the new secondary code execution start point sync marker is transferred to the FIFO unit 2022.

Figure 8B:
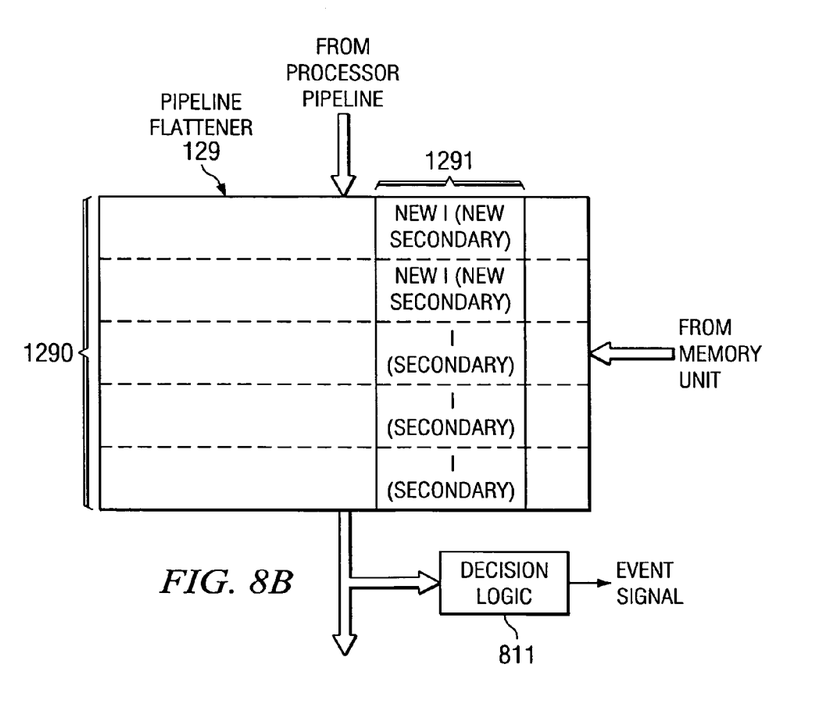
FIG. 8B illustrates the sync markers generated in the presence of a new secondary code start point identification.

Referring to FIG. 8B, the generation of the NEW SECONDARY CODE EXECUTION START POINT signal is illustrated. The pipeline flattener 129 includes a series of sequential locations 1290. Instruction indicia from the processor pipeline are entered in the pipeline flattener and move in sequence through the flattener. At some point in the pipeline flattener 129, the signals from the related memory unit access are included with the instruction indicia. Also included in each instruction indicia is a location subgroup 1291 that stores the origin of the instruction. In FIG. 8B, a NEW I indicates a new secondary code instruction and an I indicates an original secondary code instruction. The instructions exiting from the pipeline flattener 129 is applied to the decision logic 811. When the portion 1291 containing the identification of the type of code changes (i.e., from I to NEW I) for the instruction exiting from the pipeline flattener, the decision logic generates an event signal. The event signal is applied to the trigger unit 209. The trigger unit 209, in response, to this event signal generates a NEW SECONDARY CODE EXECUTION START POINT sign that is applied to the decoder unit 2023.

Referring to FIG. 8C, examples of the sync markers in the program counter trace stream are shown. The start of the test procedure is shown in first point sync marker 801. Thereafter, periodic sync ID markers 805 can be generated. Other event markers can also be generated. The identification of a NEW SECONDARY CODE EXECUTION START POINT signal results in the generation of the new secondary code execution start point sync marker 810. Periodic sync ID signals can be generated between the new secondary code execution start point sync marker and the end of the instruction execution.

Figure 8D:
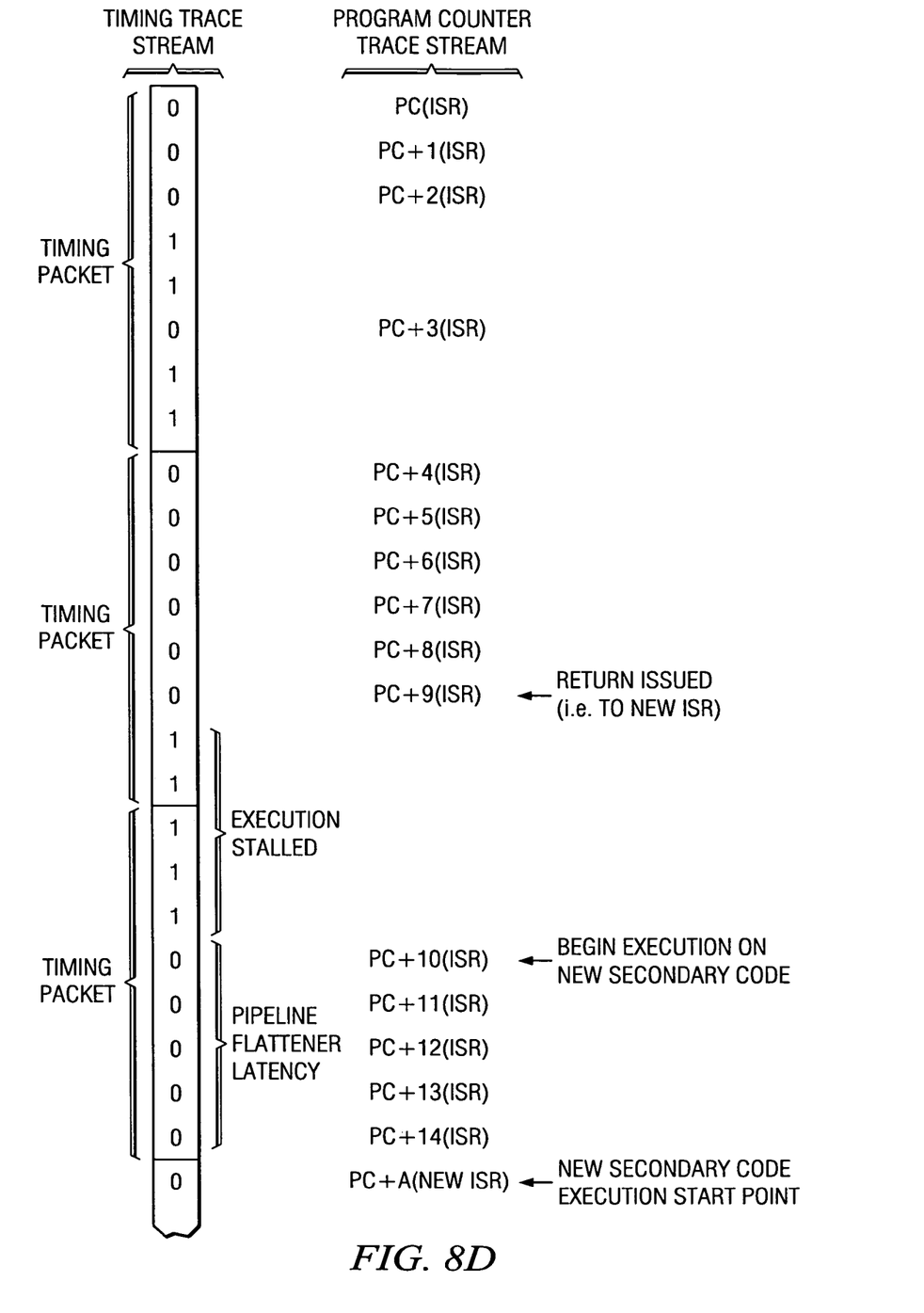
FIG. 8D illustrates the reconstruction of the target processor code execution from the trace streams according to the present invention.

Referring to FIG. 8D, a reconstruction of the program counter trace stream from the sync markers of FIG. 8B and the timing trace stream is shown. The first sync point marker indicates the beginning of test procedure with a program counter address PC(ISR), i.e., the program counter address of the original interrupt service routine. The interrupt service routine continues to execute unit with the program counter addresses being related to a particular processor clock cycle. When the execution of the original interrupt service routine is ended (e.g., a RETURN signal issued), the instruction execution is halted at program counter at address PC+9 (ISR). During the return procedure, the program counter does not advance as indicated by the logic "1"s associated with each clock cycle (i.e., execution is stalled). Sync ID markers (not shown) can be generated. At program counter address PC+10, the new interrupt service routine (secondary) code execution is initiated. The instructions resulting from the original interrupt service routine in the pipeline flattener are removed from the pipeline flattener. The number of clock cycles to implement this removal is determined by the pipeline flattener latency. After the last interrupt service routine code instruction is removed, i.e., PC+14 (ISR) from the pipeline flattener, the NEW SECONDARY CODE EXECUTION START POINT signal is generated, resulting in a new secondary code execution code start point sync marker, when the first instruction of the new secondary code execution exits from the pipeline flattener.

2. Operation of the Preferred Embodiment

The present invention relies on the ability of relate the timing trace stream and the program counter trace stream. This relationship is provided by having periodic sync ID information transmitted in each trace stream. In addition, the timing packets are grouped in packets of eight signals identifying whether the program counter or the pipeline advanced or didn't advance. The sync markers in the program counter stream include both the periodic sync ID and the position in the current eight position packet when the event occurred. Thus, the clock cycle of the event can be specified. In addition, the address of the program counter is provided in the program code start point sync markers so that the start of the program code can be related to the execution of the target processing unit. Thus, the new secondary code execution start point sync marker generated in the program counter trace stream as a result of the return to the new secondary program, the new secondary code execution unit can be related to the target processor clock, the execution instruction stream of the target processor, and to the generation of the NEW SECONDARY CODE EXECUTION START POINT signal that was the result of the change of executing program codes.

The sync marker trace steams illustrated above relate to an idealized operation of the target processor in order to emphasize the features of the present invention. Numerous other sync events (e.g. branch events) will typically be included in the program counter trace stream.

In the testing of a target processor, large amounts of information need to be transferred from the target processor to the host processing unit. Because of the large amount of data to be transferred within a limited bandwidth, every effort is provided to eliminate necessary information transfer. For example, the program counter trace stream, when the program is executed in a straight-forward manner and the sync ID markers are not present, would consist only of a first and last sync point marker. The execution of the program can be reconstructed as described with respect to FIG. 7. The program counter trace streams includes sync markers only for events that interrupt/alter the normal instruction execution such as branch sync markers and debug halt sync markers.

In the foregoing discussion, the sync markers can have additional information embedded therein depending on the implementation of the apparatus generating and interpreting the trace streams. This information will be related to the parameters shown in FIG. 5. It will also be clear that a data trace stream, as shown in FIG. 2 will typically be present. The periodic sync IDs as well as the timing indexes will also be included in the data trace stream. In addition, the program counter absolute address parameter can be replaced by the program counter off-set register in certain situations.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. During the testing of the operation of processing unit, a system for identifying an occurrence of a new secondary code execution start point condition in a pipeline flattener, the system comprising:

timing trace apparatus responsive to signals from the processor unit, the timing trace apparatus generating a timing trace stream;

program counter trace apparatus responsive to signals from the processing unit, the program counter trace apparatus generating a program counter trace stream; and synchronization apparatus applying periodic signals to the timing trace apparatus and to the program counter trace apparatus, the periodic signals resulting in periodic sync markers in the timing trace stream and in the program counter trace stream;

wherein the program counter trace apparatus is responsive to a new secondary code execution start point signal, the program counter trace apparatus generating a sync marker signal group identifying the occurrence of the new secondary code execution start point signal and relating the beginning of new secondary code execution start point to the timing trace stream and to the program code execution.

2. The system as recited in claim 1 wherein the marker signal group includes a program counter address, a timing index and a periodic sync ID.

3. The system as recited in claim 1 further comprising:
a data trace apparatus responsive to signals from the processing unit, the data trace apparatus generating a data trace stream, wherein the periodic signals are applied to the data trace apparatus resulting in periodic sync markers in the data trace stream; and
a host processing unit, the host processing unit responsive to the timing trace stream, the program counter trace stream and the data trace stream, the host processing unit reconstructing a processing activity of the processing unit from the trace streams.

4. The method for communicating an occurrence of a new secondary code execution start point signal from a target processor unit to a host processing unit after return from an original secondary code execution sequence, the method comprising:
generating a timing trace stream, a program counter trace stream, and a data trace stream, and
in the program counter trace stream, including a new secondary code execution start point sync marker signal group. indicating an occurrence of a new secondary code execution start point signal and relating the signal occurrence to the data trace stream and to the timing trace stream.

5. The method as recited in claim 4 further comprising:
including periodic sync markers in the timing trace stream and in the program counter trace stream; and
including in the new secondary code execution start point sync marker reference to a periodic sync marker.

6. In a processing unit test environment wherein a target processor transmits a plurality of trace streams to a host processing unit, the target processor including a target processor clock, a new secondary code execution start point sync marker signal group in a trace signal stream, the marker signal group comprising:
an indicia of an occurrence of a new secondary code execution start point signal;
an indicia of the relationship of the occurrence of the new secondary code execution start point signal to the target processor clock; and
an indicia of the relationship of the occurrence of the new secondary code execution start point signal to a currently executing target processor program.

7. In a target processing unit generating trace test signals for transfer to a host processing unit, a program counter trace generation apparatus comprising:
a sync marker assembly apparatus, the sync marker assembly apparatus including:
a storage unit;
a decoder unit responsive to a new secondary code execution start point signal for storing an indicia of the new secondary code execution start point signal in the storage unit, the decoder unit generating a control signal;
a gate unit having a timing index, a periodic sync signal, and a program counter address, the gate unit storing the timing index, the periodic sync signal and the program counter address in the storage unit in response to the control signal; and
a FIFO unit, the storage unit transferring selected stored signals to the FIFO unit in the form of a program code start point sync marker.

8. The program counter trace apparatus as recited in claim 7 responsive to a selected control signal for transferring the new secondary code execution start point sync marker in the FIFO unit to an output port of the target processing unit.

9. The program counter trace apparatus as recited in claim 8 wherein the apparatus can form a periodic sync marker in response to a periodic sync signal.

10. The program counter trace apparatus as recited in claim 9, the target processor including a pipeline flattener, wherein the new secondary code execution start point signal indicates a change from a first instruction code sequence to a second instruction code sequence exiting the pipeline flattener.

11. The program counter trace apparatus as recited in claim 10 wherein the first instruction code sequence is an original interrupt service routine code and the second instruction sequence is a new interrupt service routine.

* * * * *